United States Patent Office 3,738,800
Patented June 12, 1973

3,738,800
DISPERSE AND DIRECT TEREPHTHALOYL CHLO-
RIDE-AMINOAZOBENZENE COTTON DYE MIX-
TURE AND POLYESTER AND CELLULOSE DYE-
ING WITH SAID MIXTURE
Anton Mudrak, Broadview Heights, Ohio, and John A.
Zelek, Gastonia, N.C., assignors to Kewanee Oil Company, Bryn Mawr, Pa.
No Drawing. Continuation-in-part of application Ser. No.
821,977, May 5, 1969, which is a continuation of application Ser. No. 613,408, Feb. 2, 1967, now abandoned. This application May 24, 1972, Ser. No. 256,525
Int. Cl. D06p 3/82
U.S. Cl. 8—21 C                                6 Claims

ABSTRACT OF THE DISCLOSURE

Cotton/polyester fibers are dyed in a one step dyeing process using a dye bath containing a disperse dye for the polyester and a direct dye having good resistance to degradation at the high temperature required for dyeing polyester fibers. The direct dye is selected from a group of compounds that are derived by the reaction of terephthaloyl chloride with various amino-azobenzene compounds and are represented by the formula

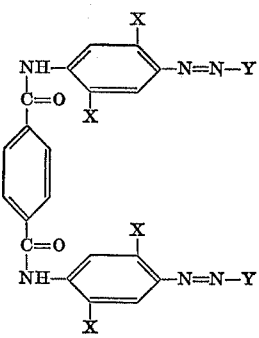

wherein Y represents a group selected from the class consisting of $-C_6H_4SO_3Na$, $-C_{10}H_5(SO_3Na)_2$, and $-C_6H_3(OH)COONa$, and X is a group selected from the class consisting of hydrogen, methyl and methoxy.

RELATED APPLICATION

This application is a continuation-in-part of application Ser. No. 821,977, filed May 5, 1969 which in turn is a continuation of application Ser. No. 613,408, filed Feb. 2, 1967, now abandoned.

DESCRIPTION OF THE PRIOR ART

It is well known that the best procedure for applying dyes to polyester involves temperatures of about 255° F. at which temperature very few dyes suitable for cotton retain their true color characteristics. Consequently, it has been necessary to dye cotton-polyester blends in two-step cycles. The first step is to apply the dyestuff onto the polyester at about 255° F. and the second is to apply the direct dye onto the cotton at a lower temperature of about 210° F. The elimination of one of these steps would be an economical advantage.

Coloring of cellulose materials, including cotton and rayon textile fibers and papers, as well as protein fibers, including silk and wool, and synthetic polyamides such as nylon may be done over a very wide range of shades and fastness to light, washing, drycleaning, etc. by use of a wide class of organic compounds known as direct dyes.

There are a number of criteria for the performance characteristics of direct dyes, the most important of which are frequently lumped under one term "substantivity." The depth or shade which can be developed, the extent to which coloring matter is exhausted from the dye liquors during dyeing, the rate and uniformity with which the dye may be applied and its fastness to scouring with water and detergents are all part of its substantivity or affinity for cellulose. Other important properties, of course, are fastness to light, drycleaning and rubbing, and, more recently, resistance to thermal degradation and chemical attack by resin curing agents.

A wide variety of chemical and structural features of direct dye molecules have been cited in the literature as having a bearing on substantivity. The most important of these seems to be the presence of several sites of very high electron density, capable of participation in hydrogen bond formation, distributed uniformly throughout the molecule, and only enough solvation sites, also uniformly distributed, to render the dye only moderately soluble in water. Thus, the presence in a molecule of hydroxyl, amino, amido and azo groups, which participate readily in hydrogen bonding, produces substantivity while the presence of sulfonic acid groups produces solubility.

Fastness to light, and resistance to thermal degradation and chemical attack are probably all closely related and dependent upon the structural stabilty of the molecule and the absence of easily oxidized, hydrolyzed or reduced linkages. Thus, the higher the degree of aromaticity and the greater and more uniform the conjugation, the more resistant will be the dye to actinic and thermal degradation, while the absence of aldehyde, nitro, halogen and olefin groupings in the molecule contributes to its resistance to chemical attack and, to some extent, to its resistance to actinic and thermal degradation as well.

DESCRIPTION OF THE PRESENT INVENTION

It is an object of this invention to provide direct dyes that can be mixed and applied simultaneously with the polyester dyes at elevated temperatures, eliminating the necessity for the second step of the two-step cycle.

The organic compounds used as the direct dyes in the present invention provide a nearly perfect combination of structural and chemical features for use as fast, thermally stable direct dyes. These substances are characterized by a structural element which is stipulated to be largely responsible for their stability. This characteristic element is a symmetrical bisterephthalamide about which various azo groupings are arranged. While these compounds are generally shown in the sodium salt form, since this is the form in which the product is generally found, it is intended that the acid form is likewise covered by these formulas.

The compounds used as direct dyes in this invention are represented by the formula

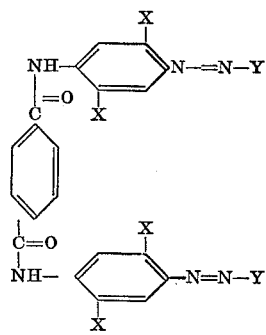

wherein each Y represents a group selected from the class consisting of $-C_6H_4SO_3Na$, $-C_{10}H_5(SO_3Na)_2$, and $-C_6H_3(OH)COONa$; and X is a radical selected from the class consisting of hydrogen, methyl and methoxy. While various substituent groups in the Y radicals can occupy various positions in the aromatic nuclei, the preferred respective structures are:

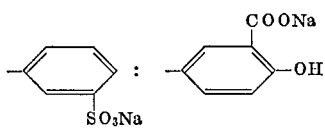

and

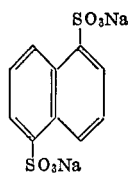

These direct dyes are mixed with any of the well known disperse dyes useful for the coloring of polyester fibers such as diazo or anthraquinone dyes and the blend is thereafter used as a dye bath for the one step dyeing of cotton/polyester fabrics. The dyed fabrics are characterized by good light fastness, as well as good resistance to thermal degradation and the harsh effects of drycleaning, washing and chemical attacks.

This invention will be more fully described by the following examples which are given merely by way of illustration. They are not intended to limit or restrict the scope of the invention, nor the manner in which it may be practiced. In these examples and throughout the specification, unless specifically provided otherwise, parts and percentages are given by weight.

Example I

Diazotization: A solution of 2-naphthylamine-4,8-disulfonic acid is prepared by adding 30.3 g. of this material to 50 ml. of water and 28.7 ml. of 30% hydrochloric acid and stirring for ½ hour. This solution is cooled with ice to 14° C., and then 6.9 g. of sodium nitrite dissolved in water is added. This is stirred for 1 to 2 hours. A solution of cresidine is prepared by adding 14.4 g. to 150 ml. of water and 13 ml. of 30% hydrochloric acid and stirring until dissolved. This cresidine solution is added to the above prepared diazonium solution at 20° C.

A solution of 2.3 grams of sodium acetate in water is added and the mixture stirred overnight with no temperature control. Then the temperature is raised to 65–80° C. for two hours and the mixture is filtered while warm. The filter cake is washed with 20% salt solution. The resultant product has the formula

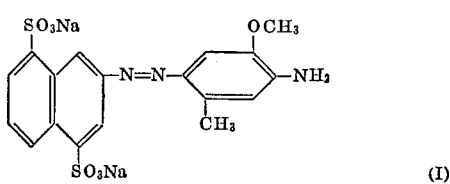

Condensation of Compound I with terephthaloyl chloride.—To 350 ml. of water is added 9 grams of Compound I (which can be added as 32 g. of 28.2% paste). Then sufficient sodium carbonate is added to make the batch alkaline to Brilliant Yellow. The temperature is then raised to 50–75° C. and in small portions 2.03 g. of terephthaloyl chloride is added maintaining the batch alkaline to Brilliant Yellow with sodium carbonate. The batch is stirred at 65–75° C. for 3–4 hours. The product is filtered and washed with 20% salt solution. The resultant compound is a yellow direct dye and has the formula:

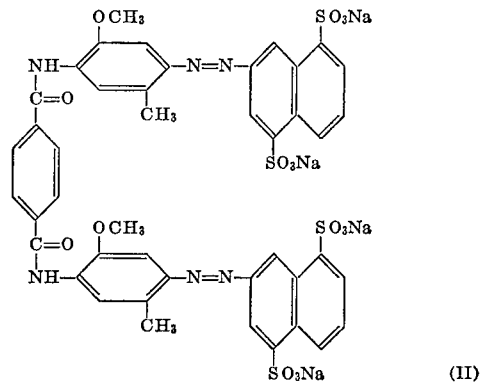

3.1 pounds of this dye is thoroughly wetted and made into a paste with a small amount of softened water at 180° F. and is then completely dissolved in additional water. A 110 pound sample of a 50/50 blend of a polyester/cotton fabric is placed on a rack of a pressure beck and the beck is filled with water. The bath temperature is set at 120° F. after which 1 g./l. of a monosodium phosphate is added as a chelating agent. Sufficient acetic acid is added to adjust the pH of the bath to 5.5–6, and a suitable carrier for the polyester fabric is added. The bath is mixed for 15 minutes after which the direct dye in solution and a yellow disperse polyester dye of the diazo or anthraquinone type dye are added followed by 15 minutes of further mixing. The weight ratio of bath to fabric is 30:1. 10% by weight of sodium chloride is added and the temperature is raised to 250–255° F. at a rate of 2° per minute. Less salt is added for pastel shade and more salt for deeper shades. The fabric is dyed at constant temperature for one hour, after which the bath is cooled, water rinsed and rinsed with 15%–20% sodium chloride to fix the dye.

Example II

To 200 ml. of water are added with stirring 12.9 g. of 4-amino-4'-hydroxyazobenzene-3'-carboxylic acid and 15.4 g. of 4-amino-3-methoxyazobenzene-3'-sulfonic acid. Enough sodium carbonate is added to bring the pH to 8–9. The mixture is heated to 70–75° C. and over a period of one hour 10.2 g. of terephthaloyl chloride is added incrementally, keeping the mixture alkaline to Brilliant Yellow by the addition of sodium carbonate. This is after four hours of stirring at 70–75° C., the mixture is filtered. If unreacted amine is present, the filter cake is then slurried in 400 ml. of hot water and enough sodium carbonate is added to bring the pH to 9–9.5. The mixture is heated to 75–80° C. and filtered while hot. If filtration is slow, the solution is diluted with an equal volume of isopropyl alcohol before filtering. The filter cake is dried at 50–60° C. The resultant compound is a yellow direct dye and has the formula:

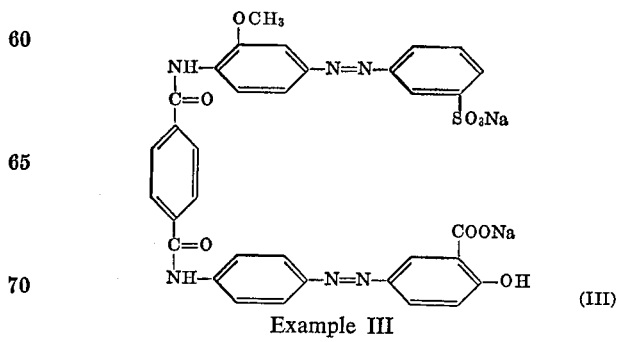

Example III

The procedure of Example II is repeated using 25.8 g. of 4-amino-4'-hydroxyazobenzene-3'-carboxylic acid and omitting the 4-amino-3-methoxyazobenzene-3'-sulfonic acid. The resulting product is a yellow direct dye and has the formula

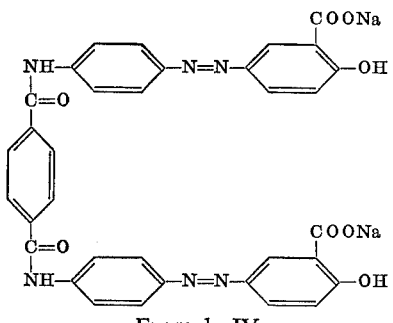

Example IV

The procedure of Example II is repeated using 30.8 g. of 4-amino-3-methoxyazobenezene-3′-sulfonic acid and omitting the 4-amino-4′-hydroxyazobenzene-3′-carboxylic acid. The resultant compound has the formula and is useful as a yellow direct dye:

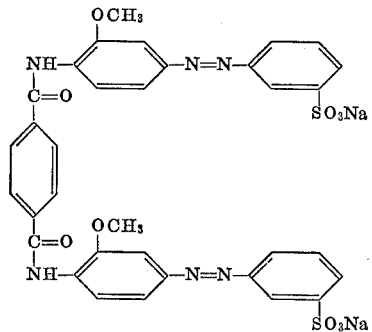

Example V

The procedure of Example II is repeated using in place of the 4-amino-3-methoxyazobenezne-3′-sulfonic acid, an equivalent amount of 4-amino-azobenzene-3′-sulfonic acid. The resulting product has the formula:

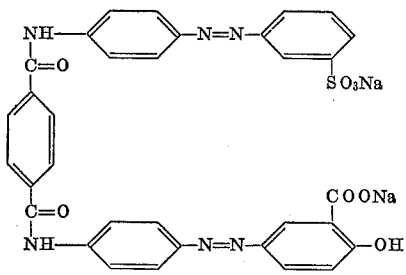

Example VI

The procedure of Example II is repeated using in place of the 4-amino-3-methoxyazobenzene-3′-sulfonic acid, an equivalent amount of 4-amino-3,6-dimethoxy-azobenzene-3′-sulfonic acid. The resulting product has the formula:

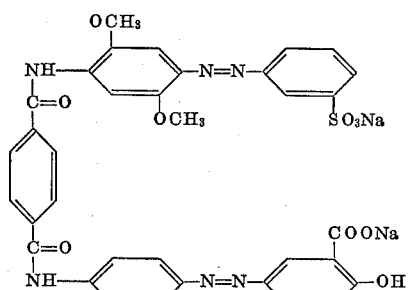

Example VII

The procedure of Example II is repeated using in place of the 4-amino-4′-hydroxyazobenzene-3′-carboxylic acid, an equivalent amount of 4-amino-3-methyl-4′-hydroxyazobenzene-3′-carboxylic acid. The resulting product has the formula:

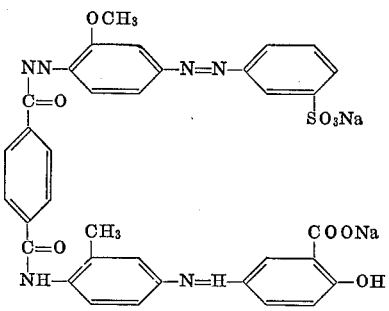

Example VIII

The procedure of Example I is repeated using 4.5 g. of Compound I of that example and using an equivalent amount of 4 - amino-4′-hydroxyazobenzene-3′-carboxylic acid. The resultant compound has the formula:

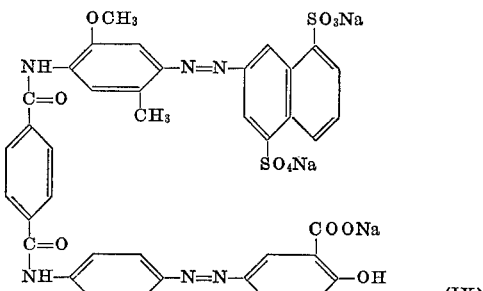

Example IX

The procedure of Example I is repeated using only 4.5 g. of Compound I of that example and using also an equivalent amount of 4-amino-3-methoxyazobenzene-3′-sulfonic acid. The resultant compound has the formula:

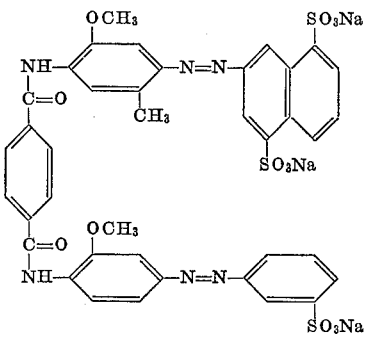

One or more of these direct dyes can be mixed with any of the well known disperse dyes that are typically used for dyeing polyesters to permit the dyeing of the polyester-cotton fabric blends in a one-step dyeing operation at temperatures between 250° and 260° F. These fabrics may vary in content 10/90 to 90/10 polyester/cotton. Fabrics may be dyed in any of the commonly used dyeing processes and apparatus, including pressure and regular beck dyers, and beam dyers.

Details on the synthesis of suitable disperse organic dyes for the polyester fabrics can be found in the literature. See, for example, The Chemistry of Synthetic Dyes and Pigments (1955) edited by H. A. Lubs.

This one-step process is applicable to other fiber blends that have heretofore required a 2 step dyeing process to dye a synthetic fiber such as a polyester, a polyamide or an acrylic fiber with a disperse dye at a higher temperature followed by dyeing of a cellulosic fiber such as cotton, rayon or linen with a direct dye at a lower temperature.

Other modifications and variations can likewise be included within the purview of this invention without departing from the scope thereof as represented by the present claims.

We claim:
1. A method of dyeing a cotton-polyester blend comprising mixing a cotton dyestuff with a polyester dyestuff and applying said dyestuffs simultaneously to a cotton-polyester blend at a temperature of approximately 255° F., said cotton dyestuff being selected from dyestuffs of the formula

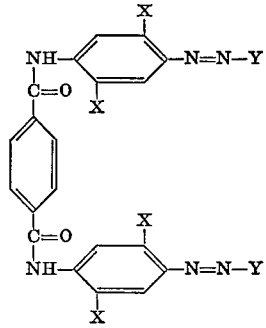

wherein Y represents a radical selected from the class consisting of —C$_6$H$_4$SO$_3$H, —C$_{10}$H$_5$(SO$_3$H)$_2$,

—C$_6$H$_3$(OH)COOH and the sodium salts thereof; and X is a radical selected from the class conisting of hydrogen, methyl and methoxy.

2. A method as stated in claim 1 wherein the cotton dyestuff has the formula:

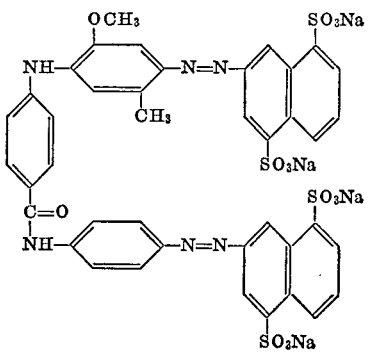

3. A method as stated in claim 1 wherein the cotton dyestuff has the formula:

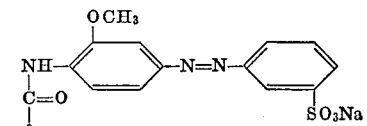

4. A method as stated in claim 1 wherein the cotton dyestuff has the formula:

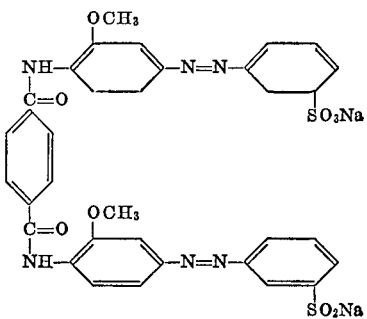

5. A dye bath for dyeing a fabric blend of a cellulosic fiber and a synthetic fiber dyeable with disperse dyes containing a direct dye having the formula:

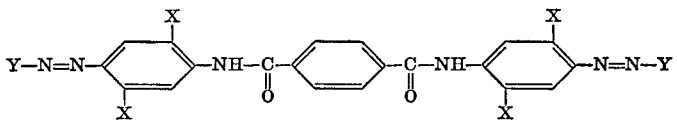

wherein Y represents a radical selected from the class consisting of —C$_6$H$_4$SO$_3$H, —C$_{10}$H$_5$(SO$_3$H)$_2$,

—C$_6$H$_3$(OH)COOH and the sodium salts thereof and X is a radical selected from the class consisting of H, CH$_3$ and OCH$_3$ and a disperse dye.

6. The dye mixture of claim 5 wherein the disperse dye is selected from the group consisting of anthraquinone dyes and diazo dyes.

References Cited
UNITED STATES PATENTS

| | | | |
|---|---|---|---|
| 2,899,305 | 8/1959 | Bosshard | 260—174 UX |
| 3,487,067 | 12/1969 | Mudrak et al. | 260—174 X |

DONALD LEVY, Primary Examiner

U.S. Cl. X.R.

8—26